3,481,309
PRESSURE MILKING MACHINE
Donald Lewis, Colyton, England, assignor to Weycroft Macford Limited, Hamworthy, Poole, Dorset, England, a British company
Filed Apr. 19, 1967, Ser. No. 632,043
Claims priority, application Great Britain, Apr. 21, 1966, 17,565/66
Int. Cl. A01j *3/00, 5/00*
U.S. Cl. 119—14.18
3 Claims

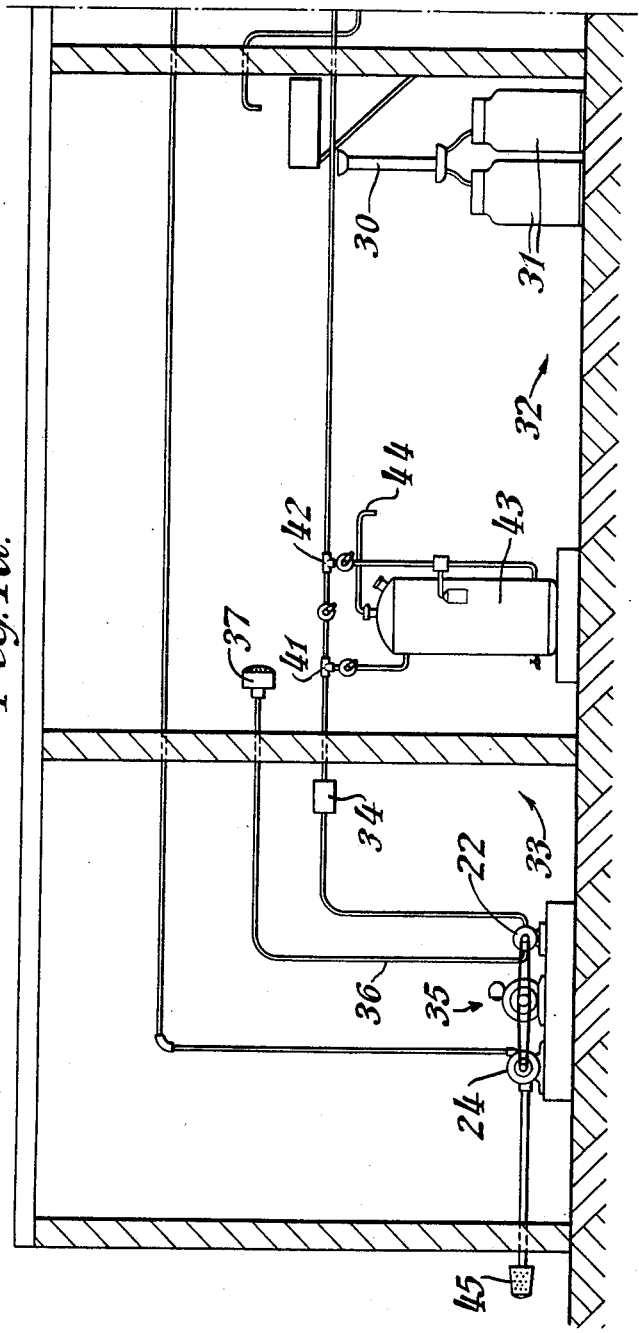

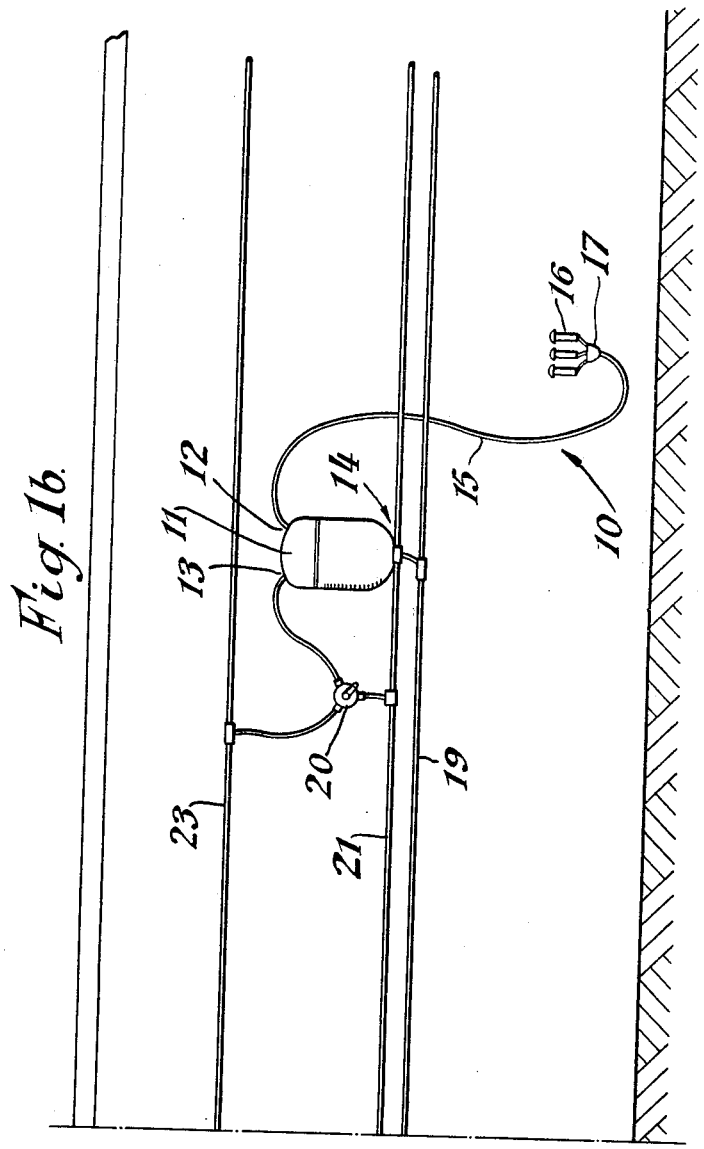

ABSTRACT OF THE DISCLOSURE

The invention relates to milking apparatus comprising a milk receiving jar connected to a plurality of teat cups adapted to be attached to the milking teats of a cow, vacuum means for reducing the pressure in said milk receiving jar to effect transport of milk from said teat cups to said jar and a pressure line coupled to said receiving jar for pressurising the same and a transport line connecting said milk receiving jar with a discharge point in which the receiving jar is subjected to reduced pressure from said vacuum line to effect transfer of milk from the teat cups to the jar and which on completion of the milking operation, the milking jar is pressurised by means of said pressure line to effect transport of milk from the container via said transport line to the discharge point. The vacuum line and pressure line are coupled to the receiving jar via a two-way control valve and a common inlet to the jar to permit switching from one means to the other and to prevent both means operating on the milk receiving jar at the same time.

---

The present invention relates to milking machines and has particular reference to milking machines which do not necessitate the use of a milk pump. Hitherto, a milking machine has comprised a plurality of teat cups adapted to be coupled to the teats of the animal to be milked, a milk receiving jar having an upper inlet for milk transported via a conduit from said teat cups to the receiving jar and a lower outlet coupled to a milk transport line leading to the dairy. The milk transport line debouches into a second receiving jar which is spring-loaded against a micro-switch. Milk is transported from the first receiving jar to the second jar by a vacuum applied to the second jar to draw milk along the transport line from the first receiving jar and into the second jar. When a given quantity of milk has been received in the second receiving jar, the jar moves against its spring loading under the additional weight of milk to operate the micro-switch thereby activating a milk pump coupled to the second jar via an outlet in the bottom thereof, which milk pump pumps the milk from the second receiving jar against the reduced pressure existing above the surface of the milk in the second receiving jar.

This process suffers from the disadvantage that considerable agitation of the milk takes place as it is drawn along the transport line under the reduced pressure from the first receiving jar to the second receiving jar and further agitation takes place as the milk is passed through the milk pump. Furthermore it is necessary for the milk pump to be constructed of stainless steel phosphor bronze or plastics materials and it is essential that the milk pump should be so constructed that no lubricant matter finds its way into the milk passing through the pump. The common point of failure in milking apparatus presently employed is failure of the milk pump for one reason or another, and failure of the milk pump results in the whole of the milking apparatus being unusable until the pump is repaired.

According to the present invention, there is provided a milking apparatus comprising liquid coupling means adapted to be coupled to a milk source, a milk receiving container connected to said liquid coupling means, vacuum means for reducing the pressure in said receiving container and said liquid coupling means to assist or effect transport of milk from said liquid coupling means to said container pressure means coupled to said receiving container for pressurising the same, and a transport line connecting said milk receiving container to the dairy, the arrangement being such that with said liquid coupling means connected to a milk source, the receiving container is subjected to a reduced pressure by said vacuum means so that milk is transferred from said milk source to said container and such that on completion of the milking operation or when said container contains a predetermined quantity of milk said container is pressurised by said pressure means to effect the transport of milk from said container via said transport line to the dairy.

The milk receiving container may be a glass jar which may be connected to said liquid coupling means via a line including one or more glass containers.

In one embodiment of the present invention the vacuum means and pressure means are coupled to said receiving container through a two-way control valve and a common inlet to the container to permit switching from one means to the other and to prevent both means operating on the milk receiving container at the same time.

Following is a description with reference to the accompanying drawing of a milking machine in accordance with the present invention.

In the drawing:

FIGURES 1a and 1b are together a diagrammatic representation of a milking machine of the invention.

The apparatus to be described will be considered with respect to one milking station although it will be appreciated that a plurality of milking stations, say six or more, can be incorporated in the specific apparatus hereinafter described and can be operated separately or in combination.

The milking station of the apparatus of the present invention indicated generally at 10 comprises a vertically disposed elongate milk receiving jar 11 of substantially cylindrical form provided with a pair of spaced inlets 12 and 13 respectively in the upper end thereof and provided with an outlet 14 in the lower end. One of the inlets 12 in the upper end of the milk receiving jar 11 is coupled by means of a flexible conduit 15 preferably of rubber to four teat cups 16 of known design the conduit 15 incorporating a four-branch connection and a non return valve or tap 17 to permit the transport of liquid from the teat cups 16 to the milk receiving jar 11. The outlet 14 in the lower end of the milk receiving jar 11 is connected by means of a flexible rubber conduit 18 incorporating a stop cock to a milk transport line 19 passing from the milking station to the dairy.

The other inlet 13 in the upper end of the milk receiving jar 11 is coupled to a two-way valve 20, one arm of which is coupled to a pressure line 21 connected in the manner hereinafter described to a compressor 22 and the other arm of which two-way valve is coupled to a vacuum line 23 connected to an exhauster 24 for reducing the pressure in said line 23. The two-way valve 20 is provided with switching means movable between a first and a second position to enable the pressure line 21 or the vacuum line 23 to be coupled via said other inlet 13 to the milk receiving jar 11 as desired.

The milk transport line 19 passing into the dairy comprises pieces of "Pyrex" glass tube joined end to end by means of rubber connecting sleeves. The milk transport line may be connected by means of a two-way valve to a known cooling apparatus so that with the valve switch means in a first position liquid in the transport line 19 passes through cooling apparatus 30 and into receiving churns 31. With the valve in the second position, the cooling apparatus is isolated and the liquid in the milk transport line passes to a plurality of outlets disposed over a sink for the purpose hereinafter defined.

The pressure line 21 coupled to one arm of the two-way valve 20 connected to said other inlet 13 of the milk receiving jar 11 also passes through the dairy 32 and into the engine house 33 where it is coupled via a filter 34 to an oilless compressor 22 which is driven by an electric motor 35 and is capable of producing a pressure of 8 lbs. per square inch at a rate of 10 cubic feet per minute. An inlet conduit 36 of oilless compressor 22 is coupled to a filter element 37 to draw in air, preferably from the dairy 32 which is or should be the cleanest part of a milking parlour.

The pressure line 21 in the dairy is provided with first and second two-way valves 41 and 42 respectively the first valve 41 being coupled to the upper end of a 30 gallon water cylinder 43 provided with an immersion heater the second valve 42 being coupled to the lower end of said cylinder 43, the upper end of said water cyilnder also being provided with a pressure relief valve and overflow means 44 to allow for expansion of the water in the tank during heating by the immersion heater.

The vacuum line 23 is connected directly to an exhauster 24 capable of providing a considerably reduced pressure within the vacuum line 23 and in the milk receiving jar 11. The exhauster 24 is driven by the same electric motor 35 that drives the oilless compressor 22 and the exhauster 24 is coupled to the atmosphere by means of a filter 45 to prevent backfeed of undesirable matter into the apparatus in the event of failure of the exhauster.

In operation, the teat cups 16 are connected to the milking teats of a cow and the two way valve 20 connected to the said other inlet 13 of the milk receiving jar 11 is moved to a position isolating the pressure line 21 and connecting the vacuum line 23 via said valve 20 to the upper end of said milk receiving jar 11 thereby reducing the pressure in the jar to draw milk from the teats of a cow via said teat cups 16 and through the conduit 15 coupling said teat cups to the upper end of the receiving jar 11 into the jar itself. At the termination of the milking operation, the volume of milk in the receiving jar 11 is read off from a graduated scale on the side of the jar and is recorded in the records kept for each cow.

The switch in the two-way valve 20 connected to said other inlet 13 of the milk receiving jar 11 is then turned to a position connecting the pressure line 21 with said inlet 13 and the stopcock below the outlet 14 in the bottom of the jar is then opened. With the two-way valve located in the milk transport line in the dairy in the first position, the milk is forced out of the receiving jar 11 by the increased pressure in the upper end of the jar 11 into the milk transport line 19 and eventually through said cooling means 30 and into the receiving churns 31.

At the completion of milking, the teat cups 16 are detached from the end of the conduit 15 connecting to the first inlet in the receiving jar and are connected to the outlets in the milk transport line disposed over the sink in the dairy. The valve in the milk transport line is then turned to the second position so that liquid in the line passes to said outlets disposed over the sink. The valves 41 and 42 in the pressure line 21 are also operated so that the increased pressure provided by the oilless compressor 22 is applied to the top of the water tank 43 containing hot water to force water via the outlet in the bottom of the tank 43 into the pressure line 21 thereby forcing the hot water through the pressure line 21, through the milk receiving jar 11 along the milk transport line 19 and finally to wash the teat cups 16 now disposed over the sink at the end of the milk transport line 19. Operation of the valve not referred to above in the milk transport line will also permit washing of the cooler apparatus 30.

In another embodiment of the present invention it is possible to incorporate between the outlet from the lower end of the cylinder and the valve connecting said outlet to the pressure line, a small venturi device coupled to a small container containing dilute nitric acid or a detergent fluid to permit discharge of a small quantity of acid or detergent into the hot wash water passing out of the water cylinder. In this way it is possible to completely and thoroughly wash the apparatus after milking thereby quickly cleaning the apparatus ready for use at the next milking time.

The apparatus described above dispenses with the use of a milk pump and also with the second receiving jar. The apparatus provides a simple and efficient method of milking which is less time consuming to use and which can be easily cleaned.

I claim:
1. In a milking machine in which milk, upon being extracted from an udder, is collected in a closed container under vacuum from a vacuum line and subsequently expelled under pressure from a pressure line therefrom into a line for conveying said milk to storage, the improvement comprising a wash-water tank having a pressure inlet near the top and a water outlet near the bottom, said tank being switchably connected to said pressure line for the introduction of wash water from said bottom outlet into said pressure line when pressure is supplied to said pressure outlet.

2. Apparatus according to claim 1, wherein said wash-water tank comprises: a heated cylinder having a pressure relief valve and an overflow valve, and said pressure line is provided with a first and second two-way valve, said first valve being connected to said pressure inlet and said second valve being connected to said water outlet.

3. Apparatus according to claim 2, wherein a venturi device, in combination with a small container adapted to receive a cleaning compound, is connected between said water outlet and said second valve in order to introduce a small quantity of said cleaning compound into the wash water.

References Cited

UNITED STATES PATENTS

| | | | |
|---|---|---|---|
| 2,102,267 | 12/1937 | Hodsdon | 119—14.17 X |
| 2,451,075 | 10/1948 | De Carli | 119—14.17 X |
| 2,616,809 | 11/1952 | Graves. | |
| 2,667,855 | 2/1954 | Scott | 119—14.17 X |
| 2,808,025 | 10/1957 | Graves | 119—14.46 X |
| 2,982,247 | 5/1961 | Varese et al. | 119—14.46 X |
| 3,233,589 | 2/1966 | Karnath | 119—14.54 |
| 3,285,297 | 11/1966 | Duft et al. | 119—14.18 X |

HUGH R. CHAMBLEE, Primary Examiner

U.S. Cl. X.R.

119—14.01; 134—169